(12) United States Patent
Smedskjaer et al.

(10) Patent No.: US 9,701,580 B2
(45) Date of Patent: Jul. 11, 2017

(54) ALUMINOSILICATE GLASSES FOR ION EXCHANGE

(75) Inventors: Morten Mattrup Smedskjaer, Painted Post, NY (US); Marcel Potuzak, Corning, NY (US); John Christopher Mauro, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/408,169

(22) Filed: Feb. 29, 2012

(65) Prior Publication Data
US 2013/0224491 A1    Aug. 29, 2013

(51) Int. Cl.
| | |
|---|---|
| B32B 15/04 | (2006.01) |
| C03C 21/00 | (2006.01) |
| C03C 3/085 | (2006.01) |
| C03C 3/087 | (2006.01) |
| C03C 3/091 | (2006.01) |

(52) U.S. Cl.
CPC ............ *C03C 21/002* (2013.01); *C03C 3/085* (2013.01); *C03C 3/087* (2013.01); *C03C 3/091* (2013.01); *Y10T 428/315* (2015.01)

(58) Field of Classification Search
CPC .. C03C 3/00; C03C 3/04; C03C 3/076; C03C 3/083; C03C 3/085; C03C 15/00; C03C 21/00; C03C 21/001; C03C 21/002; C03C 2204/08; C03C 2203/00; B32B 17/00; B32B 17/06; B32B 33/00; B32B 2255/00; B32B 2255/20; B32B 2457/20; B32B 2457/208

USPC ................ 428/428, 410, 432, 688, 426, 409
See application file for complete search history.

(56) References Cited

U.S. PATENT DOCUMENTS

| | | | |
|---|---|---|---|
| 4,726,981 A | 2/1988 | Pierson et al. | |
| 5,674,790 A | 10/1997 | Araujo | |
| 2008/0020919 A1* | 1/2008 | Murata | ............................ 501/66 |
| 2009/0197088 A1* | 8/2009 | Murata | ......................... 428/410 |
| 2009/0220761 A1* | 9/2009 | Dejneka et al. | .............. 428/220 |
| 2010/0035745 A1* | 2/2010 | Murata | ............................ 501/66 |
| 2010/0291353 A1* | 11/2010 | Dejneka | ............... C03B 33/0222 428/192 |
| 2011/0294648 A1* | 12/2011 | Chapman et al. | ............... 501/63 |
| 2012/0171497 A1* | 7/2012 | Koyama | ................. C03C 3/085 428/428 |
| 2013/0004758 A1* | 1/2013 | Dejneka et al. | .............. 428/220 |

(Continued)

FOREIGN PATENT DOCUMENTS

| | | |
|---|---|---|
| EP | 0205262 | 12/1986 |
| EP | 2594536 | 5/2013 |
| JP | 2005302289 A | 10/2005 |

(Continued)

OTHER PUBLICATIONS

WO2011/145661 English machine translation, Nov. 2011.*

(Continued)

*Primary Examiner* — Lauren R Colgan
(74) *Attorney, Agent, or Firm* — Kevin M. Johnson

(57) ABSTRACT

Glass compositions that may be used to produce chemically strengthened glass sheets by ion exchange. The glass compositions are chosen to promote simultaneously high compressive stress and deep depth of layer or, alternatively, to reduce the time needed to ion exchange the glass to produce a predetermined compressive stress and depth of layer.

15 Claims, 8 Drawing Sheets

(56) References Cited

U.S. PATENT DOCUMENTS

2013/0115422 A1    5/2013    Murata

FOREIGN PATENT DOCUMENTS

| JP | 2011-057504 | | 3/2011 |
|---|---|---|---|
| WO | 2011145661 | | 11/2011 |
| WO | WO2011/145661 | * | 11/2011 |
| WO | 2011/149811 | | 12/2011 |
| WO | 2012/008236 | | 1/2012 |

OTHER PUBLICATIONS

Mysen, B. O. and Virgo, D. (1983) Redox equilibria, structure and melt properties in the system Na2O—Al2O3—SiO2—Fe—O. Carnegie Institution of Washington Year Book, 82,313-317.

Waychunas, G.A., B.A. Rea, C.C. Fuller, and J.A.Davis. (1993) Surface chemistry of ferrihydrite: Part 1. EXAFS studies of the geometry of coprecipitated and adsorbed arsenate. Geochim. Cosmochim. Acta 57:2251-2269.

Risbud, S.H., Kirkpatrick, R.J., Taglialavore, A.P., and Montez, B. (1987) Solid-state NMR evidence of 4-, 5-, and 6-fold aluminum sites in roller- quenched SiO2—Al2O3 glasses Journal of the American Ceramic Society, 70, C10-C12.

Sato, R.K., McMillan, P.F., Dennison, P., and Dupree, R. (1991) A structural investigation of high alumina content glasses in the CaO—Al2O3—SiO2 system via Raman and MAS NMR. Physics and Chemistry of Glasses, 32, 149-154.

Stebbins J.F (1991) Experimental confirmation of five-coordinated silicon in a silicate glass at 1 atmosphere pressure. Nature, 351, 638-639.

T. Kishii, J. Ceram. Soc. Jpn. 87 (1978) 119 (in Japanese).

M.P. Dickenson, P.C. Hess, Contrib. Mineral. Petrol. 92 (1986) 207.

S. Rossano, H. Behrens, M. Wilke, Phys. Chem. Miner. 35 (2008) 77.

B. Roling, M.D. Ingram, J. Non-Cryst. Solids 265 (2000) 113.

Hess, K.-U., Dingwell, D.B., and Webb, S.L. (1995) The influence of excess alkalies on the visosity of a haplogranitic melt. American Mineralogist, 80, 297-304.

K.U Hess, DB Dingwell, The influence of alkaline-earth oxides (BeO, MgO, CaO, SrO, BaO) on the viscosity of a haplogranitic melt: systematics of non-Arrhenian behaviour, European Journal of Mineralogy, 1996.

M. M. Smedskjaer, Q. J. Zheng, J. C. Mauro, M. Potuzak, S. Morup, Y. Z. Yue, Sodium diffusion in boroaluminosilicate glasses, J. Non-Cryst. Solids 357 (2011) 3744.

McMillan, P.F. and Kirkpatrick, R.J. (1992) Al coordination in magnesium aluminosilicate glasses. American Mineralogist, 77, 898-900.

European Patent Office; International Search Report; Mailing Date: Jul. 22, 2013; pp. 1-4.

JP2014559993 Office Action Dated Nov. 1, 2016, Japan Patent Office, 5 Pgs.

English Translation of CN201380011542.2 First Search Report Dated Mar. 24, 2016.

* cited by examiner

US 9,701,580 B2

ALUMINOSILICATE GLASSES FOR ION EXCHANGE

BACKGROUND

The disclosure relates to ion exchangeable glasses. More particularly, the disclosure relates to ion exchangeable glasses that, when ion exchanged has a surface layer that is under a compressive stress of at least about 1 GPa.

The ion exchange process is used to strengthen glass by creating a compressive stress at the glass surface by replacing of relatively large alkali ions such as $K^+$ from a salt bath with smaller alkali ions such as $Na^+$ in the glass. Since glasses typically fail under tension, the created compressive stress at the surface improves the glass strength. Ion exchanged glasses thus find use in various applications such as touch-screen devices, hand held electronic devices such as communication and entertainment devices, architectural and automotive components, and the like.

When strengthened by ion exchange, a glass should simultaneously be provided with high compressive stress at the surface and a deep depth of the ion exchange layer. Soda-lime glasses are difficult to chemically strengthen by ion exchange as they require long salt bath treatment times to achieve reasonable strength by ion exchange.

SUMMARY

The present disclosure provides glass compositions that may be used to produce chemically strengthened glass sheets by ion exchange. The glass compositions are chosen to promote simultaneously high compressive stress and deep depth of layer or, alternatively, to reduce the time needed to ion exchange the glass to produce a predetermined compressive stress and depth of layer.

Accordingly, one aspect of the disclosure is to provide an alkali aluminosilicate glass. The alkali aluminosilicate glass comprises from about 14 mol % to about 20 mol % $Al_2O_3$ and from about 12 mol % to about 20 mol % of at least one alkali metal oxide $R_2O$ selected from the group consisting of $Li_2O$, $Na_2O$, $K_2O$, $Rb_2O$, and $Cs_2O$, wherein the alkali aluminosilicate glass is ion exchangeable.

A second aspect of the disclosure is to provide an alkali aluminosilicate glass. The alkali aluminosilicate glass comprises from about 55 mol % to about 70 mol % $SiO_2$; from about 14 mol % to about 20 mol % $Al_2O_3$; from 0 mol % to about 10 mol % $B_2O_3$; from 12 mol % to about 20 mol % $R_2O$, where $R_2O$ is selected from the group consisting of $Li_2O$, $Na_2O$, $K_2O$, $Rb_2O$, and $Cs_2O$; from 0 mol % to about 10 mol % MgO; and from 0 mol % to about 10 mol % ZnO. The alkali aluminosilicate glass is ion exchanged and has a compressive layer extending from a surface of the alkali aluminosilicate glass into the alkali aluminosilicate glass to a depth of layer. The compressive layer is under a compressive stress of at least 1 GPa.

These and other aspects, advantages, and salient features will become apparent from the following detailed description, the accompanying drawings, and the appended claims.

DETAILED DESCRIPTION

Figure 1:
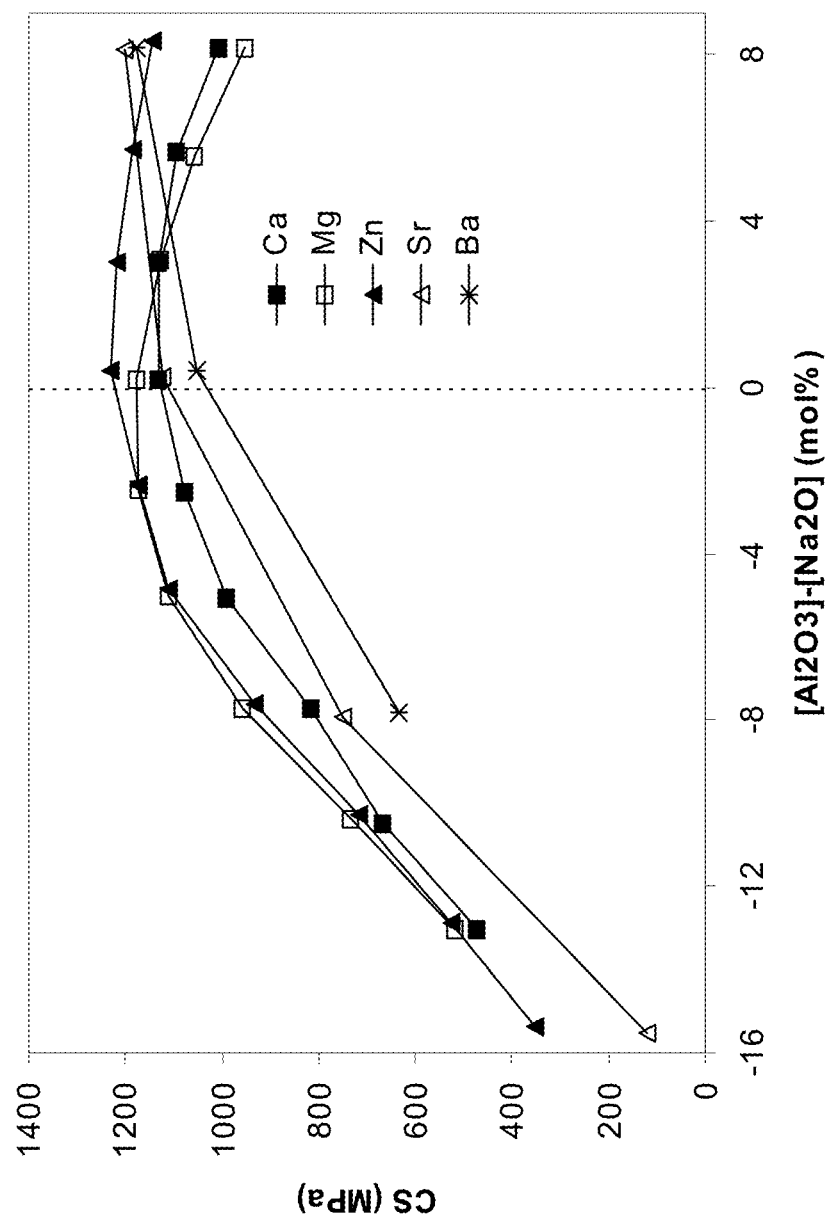
FIG. 1 is a plot of compressive stress as a function of $[Al_2O_3]-[R_2O]$.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. As used herein, the term "glass" refers to alkali aluminosilicate and/or boroaluminosilicate glasses, unless otherwise specified.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

This disclosure relates to the general area of ion exchangeable alkali aluminosilicate glasses that are capable of—or have been strengthened by—ion exchange. The ion exchange process is used to create a compressive stress at the glass surface by replacement of relatively large alkali ions from a salt bath (e.g., 10 with smaller alkali ions (e.g., $Na^+$) in the glass. Since glasses typically fail under tension, the compressive stress created at the surface improves the glass strength. Ion exchanged glasses thus find various applications, such as for touch-screen devices, hand held electronic devices such as communication and entertainment devices, architectural and automotive components, and the like.

Ion exchangeable glass compositions should be designed so as to simultaneously provide a high compressive stress (CS) at the surface and a deep depth of the ion exchange layer (depth of layer, or "DOL"). Soda-lime glasses are typically difficult to chemically strengthen by ion exchange, as they require long salt bath treatment times to achieve reasonable strength by such exchange.

The various glass compositions described herein could be used to produce chemically strengthened glass sheets by ion exchange. These glass compositions are chosen to promote simultaneously high compressive stress and deep depth of layer or, alternatively, reduced ion exchange time. The glass compositions described herein are not necessarily fusion formable or down drawable (e.g., fusion drawn or slot drawn), and may be produced using other forming methods known in the art; e.g., the float glass process.

The glasses described herein are ion exchangeable alkali aluminosilicate glasses comprising from about 14 mol % to about 20 mol % $Al_2O_3$ and from about 12 mol % to about 20 mol % of at least one alkali metal oxide $R_2O$ selected from the group consisting of $Li_2O$, $Na_2O$, $K_2O$, $Rb_2O$, and $Cs_2O$. In some embodiments, the at least one alkali metal oxide includes $Na_2O$, and $Al_2O_3$ (mol %)–$Na_2O$ (mol %)≥about –4 mol %.

In some embodiments, the glasses described herein, when strengthened by ion exchange, have a region that is under a compressive stress (compressive layer CS) that extends from the surface of the glass to a depth of layer (DOL) into the body of the glass. The compressive stress of the strengthened glass is at least about 1 GPa. In some embodiments, the compressive stress is at least about 1 GPa and $Al_2O_3$ (mol %)–$Na_2O$ (mol %)≥about –4 mol %.

In some embodiments, the glass comprises: from about 55 mol % to about 70 mol % $SiO_2$; from about 14 mol % to about 20 mol % $Al_2O_3$; from 0 mol % to about 10 mol % $B_2O_3$; from 0 mol % to about 20 mol % $Li_2O$; from 0 mol % to about 20 mol % $Na_2O$; from 0 mol % to about 8 mol % $K_2O$; from 0 mol % to about 10 mol % MgO; and from 0 mol % to about 10 mol % ZnO. In particular embodiments, 12 mol %≤$Li_2O+Na_2O+K_2O$≤20 mol %.

In one aspect, the alkali aluminosilicate glasses are sodium aluminosilicate glasses that further comprise different types of divalent cation oxides RO, also referred to herein as "divalent metal oxides" or simply "divalent oxides" in which the silica-to-alumina ratio ($[SiO_2]/[Al_2O_3]$) is not fixed, but may instead be varied. These divalent metal oxides RO include, in one embodiment, MgO, ZnO, CaO, SrO, and BaO. Non-limiting examples of such compositions having the general formula (76-x) mol % $SiO_2$, x mol % $Al_2O_3$, 16 mol % $Na_2O$, and 8 mol % RO, in which x=0, 2.7, 5.3, 8, 10.7, 13.3, 16, 18.7, 21.3, and 24 and properties associated with each composition are listed in Tables 1, 2, and 3, for R=Mg, R=Zn, and R=Ca, respectively. Non-limiting examples of such compositions, expressed in mol % where (76-x)$SiO_2$-x$Al_2O_3$-16$Na_2O$-8RO, where x=0, 8, 16, and 24, and properties associated with such compositions for R=Sr and Ba are listed in Table 5. For x=16, four glasses with [MgO]/[CaO] ratios equal to 0.25, 0.67, 1.5, and 4 were also studied, in addition to glasses with $K_2O$-for-$Na_2O$ substitutions and higher $SiO_2$ contents (Table 4). In some embodiments, these glasses are free of (i.e., contain 0 mol %) boron and boron-containing compounds, such as, for example, $B_2O_3$.

In other embodiments, the alkali aluminosilicate glasses described herein are boroaluminosilicate glasses comprising up to about 10 mol % $B_2O_3$ with varying silica-to-alumina ratios. These boroaluminosilicate glasses may, in some embodiments, be free of (i.e., contain 0 mol %) divalent metal oxides RO, such as those described hereinabove. Non-limiting examples of such boroaluminosilicate glasses having nominal compositions, expressed in mol % of: (80-y) mol % $SiO_2$, y mol % $Al_2O_3$, 15 mol % $Na_2O$, and 5 mol % $B_2O_3$, where y=0, 1, 2.5, 5, 7.5, 10, 12.5, 15, 17.5, and 20, and associated properties are listed in Table 6.

In the glass compositions described herein, $SiO_2$ serves as the primary glass-forming oxide. The concentration of $SiO_2$ should be sufficiently high in order to provide the glass with sufficiently high chemical durability suitable for touch applications. However, the melting temperature (i.e., the 200 poise temperature) of pure $SiO_2$ or high-$SiO_2$ glasses is too high to be practical for most manufacturing processes, since defects such as fining bubbles may appear. Furthermore, when compared to every oxide except boron oxide ($B_2O_3$), $SiO_2$ decreases the compressive stress created by ion exchange.

Alumina ($Al_2O_3$) can also serve as a glass former in the glasses described herein. Like $SiO_2$, alumina generally increases the viscosity of the melt and an increase in $Al_2O_3$ relative to the alkalis or alkaline earths in the glass generally results in improved durability. The structural role of aluminum ions depends on the glass composition. When the concentration of alkali metal oxides [$R_2O$] is greater than the concentration of alumina [$Al_2O_3$], all aluminum is primarily found in tetrahedral coordination with the alkali ions acting as charge-balancers. For [$Al_2O_3$]>[$R_2O$], there is an insufficient amount of alkali metal oxides to charge balance all aluminum in tetrahedral coordination. However, divalent cation oxides (RO) can also charge balance tetrahedral aluminum to varying degrees. Whereas Calcium, strontium, and barium all primarily behave in a manner equivalent to two alkali ions, the high field strength magnesium and zinc ions do not fully charge balance aluminum in tetrahedral coordination, and result in the formation of five- and six-fold coordinated aluminum. $Al_2O_3$ generally plays an important role in ion-exchangeable glasses, since it provides or enables a strong network backbone (i.e., a high strain point) while allowing for the relatively fast diffusivity of alkali ions. As evidenced by the plot of compressive stress as a function of [$Al_2O_3$]—[$R_2O$] in FIG. 1 for the glass compositions listed in Tables 1-5 after ion exchange in technical grade $KNO_3$ at 410° C. for eight hours, the presence of tetrahedral aluminum promotes a high compressive stress. As seen in FIG. 1, compressive stress CS generally increases with increasing alumina content and decreasing size of the divalent cation. In the peraluminous regime, there is an advantage from having the larger divalent cations. Most likely these cations act to charge balance tetrahedral aluminum, whereas the smaller divalent cations in MgO and ZnO do not to the same extent. In glasses with excess magnesium and zinc, however, the addition of alumina decreases the depth of the compressive layer for a given ion exchange time when [$Al_2O_3$]>[$R_2O$].

Although $B_2O_3$ is also a glass-forming oxide, it can be used to reduce viscosity and liquidus temperature. In general, an increase in $B_2O_3$ of 1 mol % decreases the temperature at equivalent viscosity by 10-14° C., depending on the details of the glass composition and the viscosity in question. However, $B_2O_3$ can lower liquidus temperature by 18-22° C. per mol %, and thus has the effect of decreasing liquidus temperature more rapidly than it decreases viscosity, thereby increasing liquidus viscosity. Furthermore, $B_2O_3$ has a positive impact on the intrinsic damage resistance of the base glass. However, $B_2O_3$ has a negative impact on ion exchange performance, decreasing both the diffusivity and the compressive stress. For example, substitution of $SiO_2$ for $B_2O_3$ increases ion exchange performance but simultaneously increases melt viscosity.

Alkali metal oxides ($Li_2O$, $Na_2O$, and $K_2O$) serve as aids in achieving low melting temperature and low liquidus temperatures. However, the addition of alkali metal oxides dramatically increases the coefficient of thermal expansion (CTE) and lowers chemical durability.

The presence of a small alkali metal oxide such as $Li_2O$ and/or $Na_2O$ is necessary to exchange with larger alkali ions (e.g., $K^+$) to perform ion exchange from a salt bath and thus achieve a desired level of surface compressive stress in the glass. Three types of ion exchange can generally be carried out: $Na^+$-for-$Li^+$ exchange, which results in a deep depth of layer but low compressive stress; $K^+$-for-$Li^+$ exchange, which results in a small depth of layer but a relatively large compressive stress; and $K^+$-for-$Na^+$ exchange, which results in intermediate depth of layer and compressive stress. A sufficiently high concentration of the small alkali metal oxide is necessary to produce a large compressive stress in the glass, since compressive stress is proportional to the number of alkali metal ions that are exchanged out of the glass. The presence of a small amount of $K_2O$ generally improves diffusivity and lowers the liquidus temperature, but increases the CTE.

Figure 2:
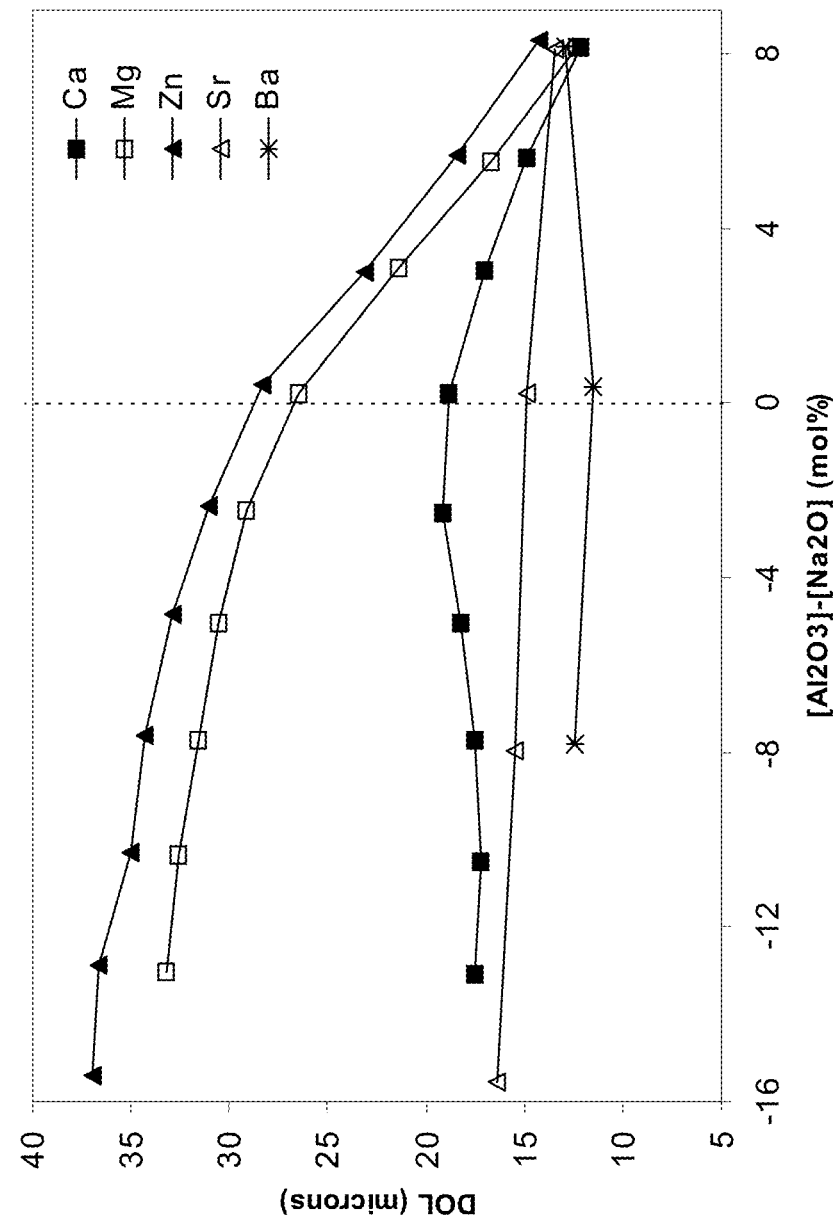
FIG. 2 is a plot of depth of layer (DOL) as a function of $[Al_2O_3]-[Na_2O]$.

Divalent cation oxides RO such as, but not limited to, alkaline earth oxides and ZnO, also improve the melting behavior of the glass. With respect to ion exchange performance, however, the presence of divalent cations acts to decrease alkali metal ion mobility. The effect on ion exchange performance is especially pronounced with the larger divalent cations such as, for example, $Sr^{2+}$ and $Ba^{2+}$, as illustrated in FIG. 2, which is a plot of depth of layer (DOL) as a function of [$Al_2O_3$]—[$Na_2O$] for ion exchanged glasses having the composition (76-x) mol % $SiO_2$, x mol % $Al_2O_3$, 16 mol % $Na_2O$, and 8 mol % RO, where x=0, 2.7, 5.3, 8, 10.7, 13.3, 16, 18.7, 21.3, and 24 for R=Mg (Table 1), Zn (Table 2), and Ca (Table 3) and x=0, 8, 16, and 24 for R=Sr and Ba (Table 5). The ion exchange was performed in a molten salt bath of technical grade $KNO_3$ at 410° C. for 8 hours. As seen in FIG. 2, DOL generally decreases with increasing alumina content, especially for the glasses containing MgO and ZnO in the peraluminous regime. Furthermore, as seen in FIG. 1, smaller divalent cation oxides generally help the compressive stress more than larger divalent cation oxides. In the glasses described herein, the concentrations of SrO and BaO are particularly kept to a minimum.

Figure 3:
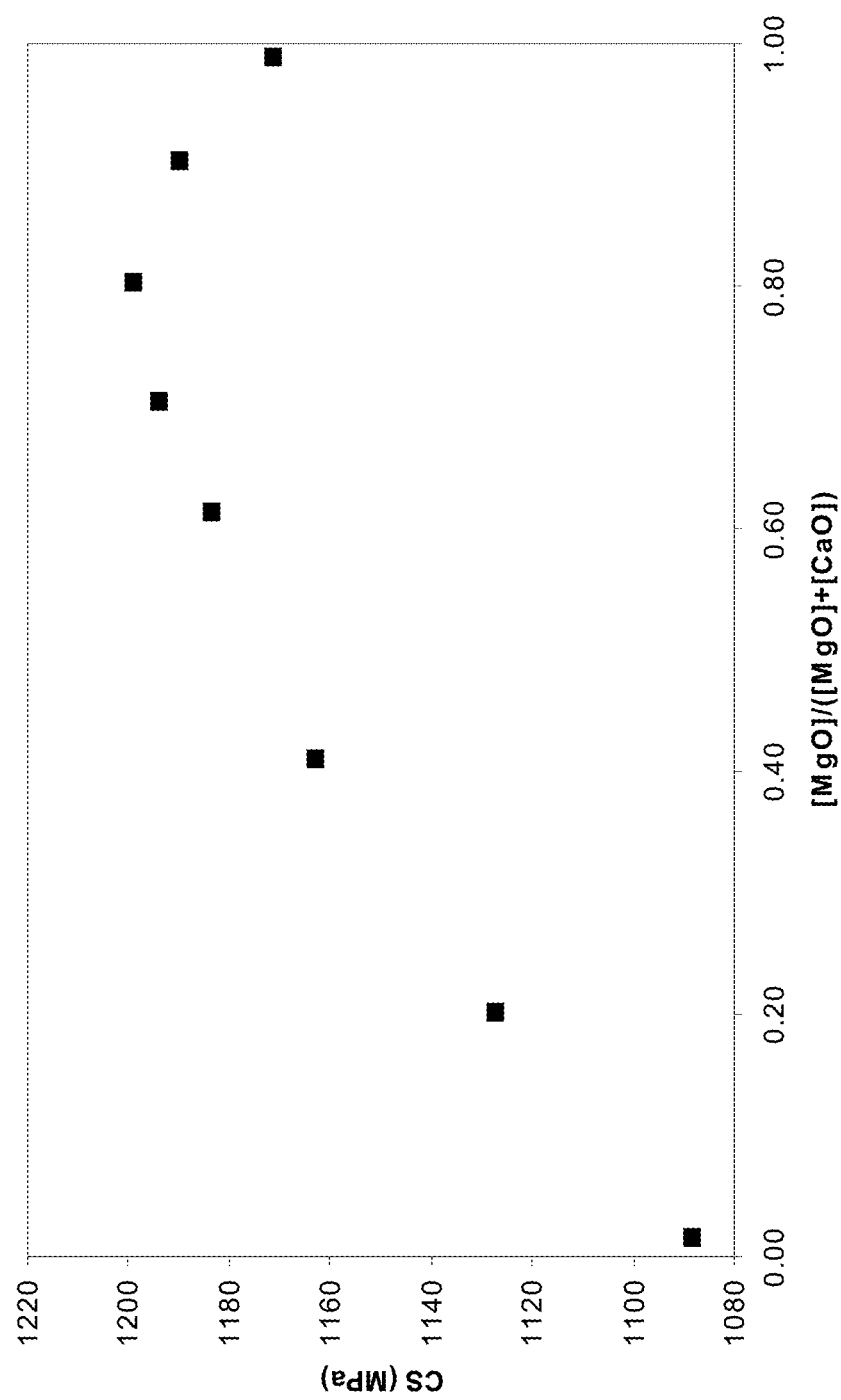
FIG. 3 is a plot of compressive stress (CS) for a fixed depth of layer of 50 μm as a function of $[MgO]/([MgO]+[CaO])$ ratio.

MgO and ZnO offer several advantages with respect to improved stress relaxation while minimizing the adverse effects on alkali diffusivity. However, when the amounts of MgO and ZnO in the glass are high, these oxides are prone to forming forsterite ($Mg_2SiO_4$) and gahnite ($ZnAl_2O_4$), or willemite ($Zn_2SiO_4$), thus causing the liquidus temperature to rise very steeply with MgO and ZnO contents. Furthermore, there may be some advantages from having a mixture of two alkaline earth oxides, as illustrated in FIG. 3, which is a plot of compressive stress (CS) for a fixed depth of layer of 50 μm as a function of [MgO]/([MgO]+[CaO]) ratio for ion exchanged glasses having the composition 60 mol % $SiO_2$, 16 mol % $Al_2O_3$, 16 mol % $Na_2O$, and 8 mol % RO. The glasses were ion exchanged in a molten salt bath of technical grade $KNO_3$ at 410° C. for different durations. As seen in FIG. 3, compressive stress CS at 50 μm generally increases with increasing magnesia content, but there is an advantage from having a mixture of CaO and MgO in the high-MgO regime.

In addition to the oxides described above, other oxides may be added to the glasses described herein to eliminate and reduce defects within the glass. For example, $SnO_2$, $As_2O_3$, $Sb_2O_3$, or the like may be included in the glass as fining agents. Increasing the concentration of $SnO_2$, $As_2O_3$, or $Sb_2O_3$ generally improves the fining capacity, but as they are comparatively expensive raw materials, it is desirable to add no more than is required to drive gaseous inclusions to an appropriately low level.

The main forming/stabilizing cations and molecules in silicate melts include $Si^{4+}$, Al, B, $Fe^{3+}$, Ti, P, and the like. The main network modifying cations and molecules include $Na^+$, $K^+$, $Ca^{2+}$, $Mg^{2+}$, $Fe^{2+}$, $F^-$, $Cl^-$, and $H_2O$, although their role in defining the structure is often controversial. Iron as $Fe^{3+}$ (ferric iron) can be a network former with coordination number IV or V and/or a network modifier with coordination V or VI, depending on the $Fe^{3+}/\Sigma Fe$ ratio, whereas $Fe^{2+}$ (ferrous) iron is generally considered to be a network modifier. As both ferric and ferrous iron can be present in liquids, changes in the oxidation state of iron can affect significantly their degree of polymerization. Therefore, any melt property that depends on the number of non-bridging oxygen per tetrahedron (NBO)/T) will also be affected by the ratio $Fe^{3+}/\Sigma Fe$. Significant portions of Si and Al may exist in five-fold coordination at ambient pressure.

In order to explore different structural roles filled by sodium in the boroaluminosilicate glasses, ten $Na_2O$—$B_2O_3$—$Al_2O_3$—$SiO_2$ glasses with variation of the [$Al_2O_3$]/[$SiO_2$] ratio were designed to access different regimes of sodium behavior. Ten additional ten glasses having the same base composition, but doped with 1 mol % $Fe_2O_3$ were also prepared to study the effect of $Fe_2O_3$ on ion exchange properties. The compositions of these glasses are designated as x mol % $Al_2O_3$, 5 mol % $B_2O_3$, (80-x) mol % $SiO_2$, and 15 mol % $Na_2O$, where x=0, 1, 2.5, 5, 7.5, 10, 12.5, 15, 17.5, and 20, with the analyzed compositions being slightly different from the batched compositions. The original naming convention based on $xAl_2O_3$, as given in Table 6, is retained. As a result of this work, the different roles/effects of sodium on the network-forming cations (Si, B, and Al) have been clarified and quantified. When Na<Al, all sodium is used to charge compensate [$AlO_4$], and [$AlO_5$] groups, which are also present in the glass and act as charge compensators due to insufficient amounts of sodium in the glass. When Na>Al, sodium first charge compensates [$AlO_4$], and all Al is thus four-coordinated and unaffected by other compositional changes. Excess sodium can be used to convert [$BO_3$] to [$BO_4$], or create non-bridging oxygens (NBOs) on Si or B, with competition among these mechanisms.

Ion exchange experiments were conducted to obtain the effective interdiffusion coefficient $\overline{D}_{Na-K}$ between $Na^+$ and $K^+$ and the compressive stress (CS) in the glasses described herein. Ion exchange was carried out by immersing polished 25 mm×25 mm×1 mm glass samples in a molten salt bath of technical grade $KNO_3$ at 410° C. for 8 hours. Following ion exchange, the penetration depth of the potassium ions was measured using an FSM-6000 surface stress meter (FSM). The $K^+$-for-$Na^+$ ion exchange gives the glass surface a higher refractive index than the interior; i.e., the surface acts as a waveguide. This is utilized in the FSM instrument to measure the saturation depth of the refractive index profile, which corresponds to the diffusion depth of potassium. A total of eight FSM measurements were performed on each sample (using four 90° rotations per face).

Figure 4:
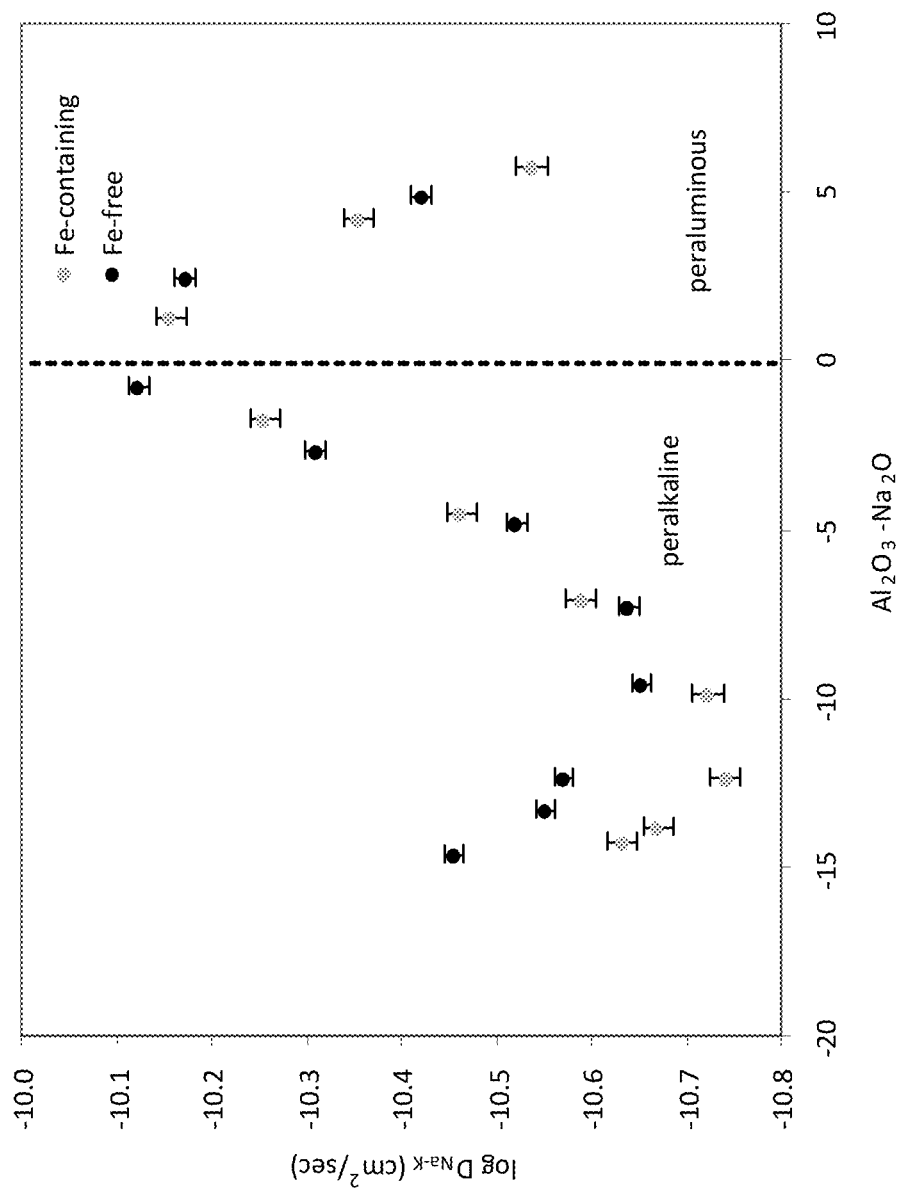
FIG. 4 is a plot of the diffusion coefficient $D_{Na-K}$ as a function of composition of the boroaluminosilicate series of glasses described herein.
Figure 5:
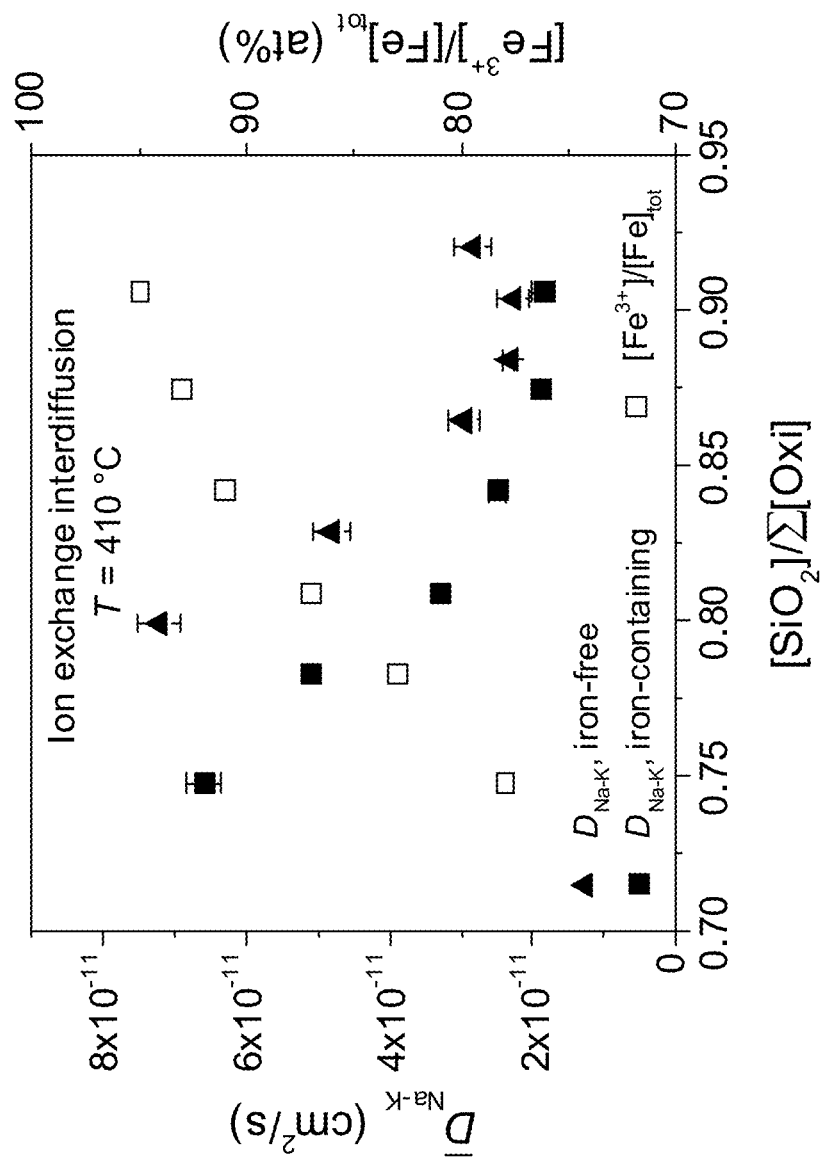
FIG. 5 a plot of the composition dependence of isothermal diffusivity and iron redox ratio.

The results of these ion exchange experiments reveal a decrease in alkali diffusivity with increasing [$SiO_2$]/[$Al_2O_3$] or [$SiO_2$]/$\Sigma$[Oxi] where $\Sigma$[Oxi]=[$SiO_2$]+[$Al_2O_3$]+[$B_2O_3$]+[$Fe_2O_3$]+[$As2O_3$] ratios for both iron-containing and iron-free glasses. FIG. 4 is a plot of the diffusion coefficient $D_{Na-K}$ as a function of composition of the boroaluminosilicate series of glasses described herein. The data plotted in FIG. 4 show that the roles of sodium and boron change as the [SiO$_2$]/[Al$_2$O$_3$] ratio changes. This trend may be ascribed to two factors. First, the structural role of sodium in influencing sodium diffusion depends on the [SiO$_2$]/[Al$_2$O$_3$] ratio. For high Al$_2$O$_3$ contents, Na$^+$ is used for charge compensation of four-fold aluminum species. In this case, the diffusion of Na$^+$ is relatively fast, as shown in FIG. 5, which is a plot of the composition dependence of isothermal diffusivity (K$^+$ for-Na$^+$ effective interdiffusion coefficient ($\overline{D}_{Na-K}$)), as determined by ion exchange experiments at 410° C., and the iron redox state, as determined by $^{57}$Fe Mössbauer spectroscopy. This fast diffusion rate of Na may be because Na$^+$ is not a rigid part of the glass network. In the low Al$_2$O$_3$ composition region, some of the sodium ions create NBOs bonded with Si—O or B—O, and these sodium ions are less mobile. Secondly, the differences in boron speciation and chemical composition lead to differences in atomic packing of the glass networks. The network becomes more densely packed with increasing [SiO$_2$]/[Al$_2$O$_3$] ratio, and this contributes to the lowering of the alkali diffusivity. FIG. 5 also reveals that the alkali diffusivity is greater in iron-free glasses than in iron-containing glasses. Furthermore, the difference in alkali diffusivity between iron-free and iron-containing glasses decreases with increasing [SiO$_2$]/[Al$_2$O$_3$] ratio while at the same time the [Fe$^{3+}$]/[Fe]$_{total}$ ratio increases (see the second y-axis in FIG. 5)). Therefore, Fe$^{2+}$ is a greater hindrance to alkali diffusivity than Fe$^{3+}$. In other words, there is little or no decrease in alkali diffusivity when iron is present as Fe$^{3+}$. The impact of iron on alkali diffusivity may be ascribed to two factors. First, there is competition between cations for the charge compensation of AlO$_4^-$ and BO$_4^-$ units. It has been shown that Fe$^{2+}$ can charge compensate AlO$_4^-$ units in aluminosilicate glasses, even though alkali ions are more efficient charge compensators than Fe$^{2+}$. It is therefore possible that some Fe$^{2+}$ ions can compete with Na+ ions for charge compensating AlO$_4^-$ (and possibly also BO$_4^-$), which could cause some of the sodium ions to create NBOs on tetrahedral silicon or trigonal boron. According to the discussion above, this will lower the alkali diffusivity. Second, the presence of relatively slowly moving divalent cations lowers the mobility of the fast moving monovalent alkali cations. Fe$^{2+}$ ions play a role as network-modifiers in the glass network, and may therefore be blocking the diffusion paths of the fast moving Na$^+$ ions (similar to the impact of alkaline earth ions on alkali diffusivity). On the other hand, Fe$^{3+}$ ions play a more network-forming role in the network, and they are therefore not occupying sites that Na$^+$ ions would use for diffusion.

Figure 6:
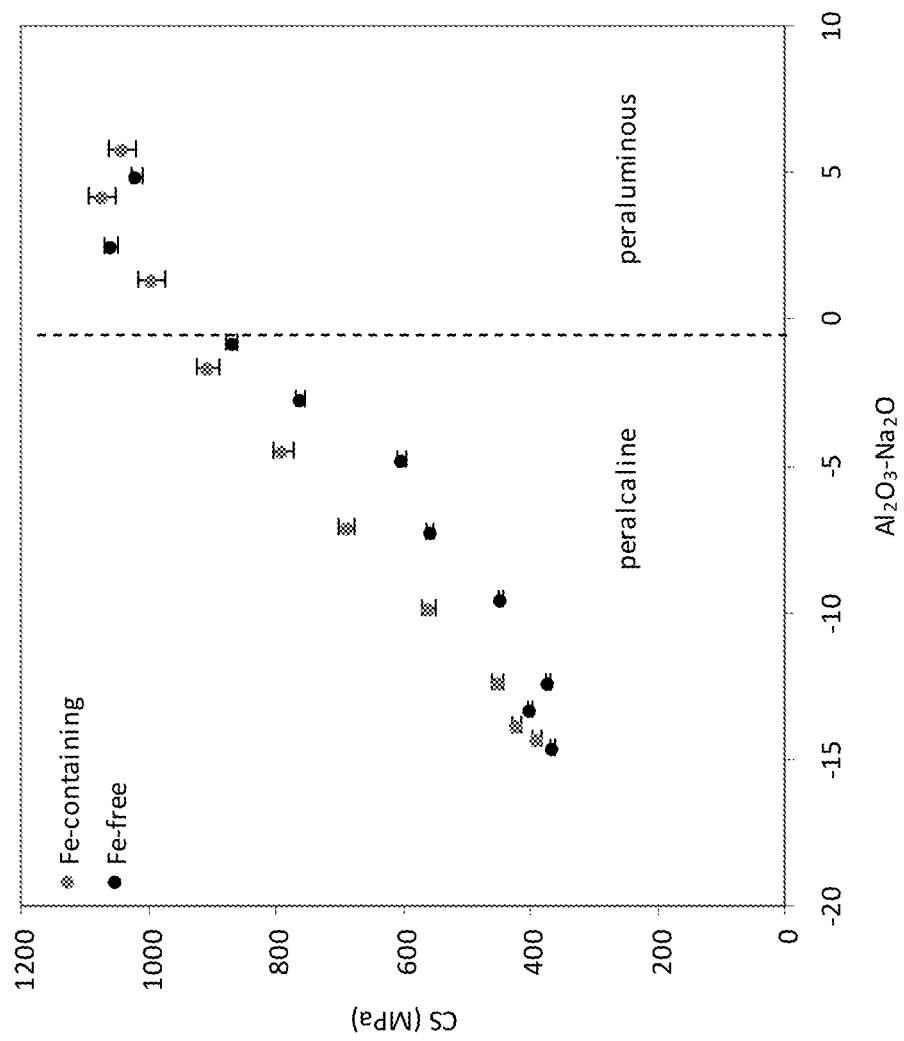
FIG. 6 is a plot of compressive stress (CS) of both Fe-free and Fe-containing boroaluminosilicate glasses as a function of composition.

FIG. 6 is a plot of compressive stress (CS) of both Fe-free and Fe-containing boroaluminosilicate glasses as a function of composition (i.e., [Al$_2$O$_3$]—[Na$_2$O]). CS was measured by FSM on the annealed samples, which were chemically strengthened in a molten salt bath of technical grade KNO$_3$ salt bath at 410° C. for 8 hours. As shown in FIG. 6, compressive stress created by ion exchange was found to monotonically increase with increasing Al$_2$O$_3$ concentration in the boroaluminosilicate glasses. This finding is in agreement with that reported above for the sodium aluminosilicate glasses with different divalent cations. The iron-containing glasses were also found to generally have higher CS than the corresponding iron-free glasses, particularly in the peralkaline regime.

Figure 7:
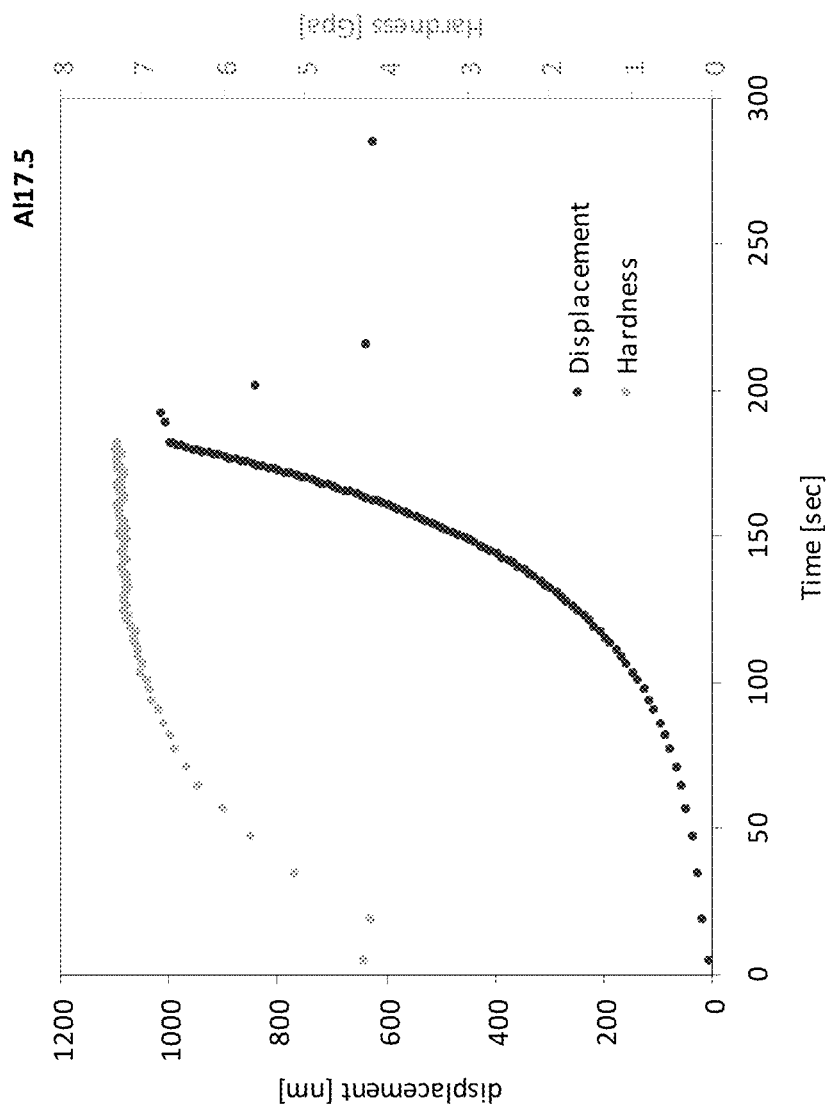
FIG. 7 a plot of the loading and penetration depth condition of the experiment performed on iron-free boroaluminosilicate glass A117.5 in Table 6.
Figure 8:
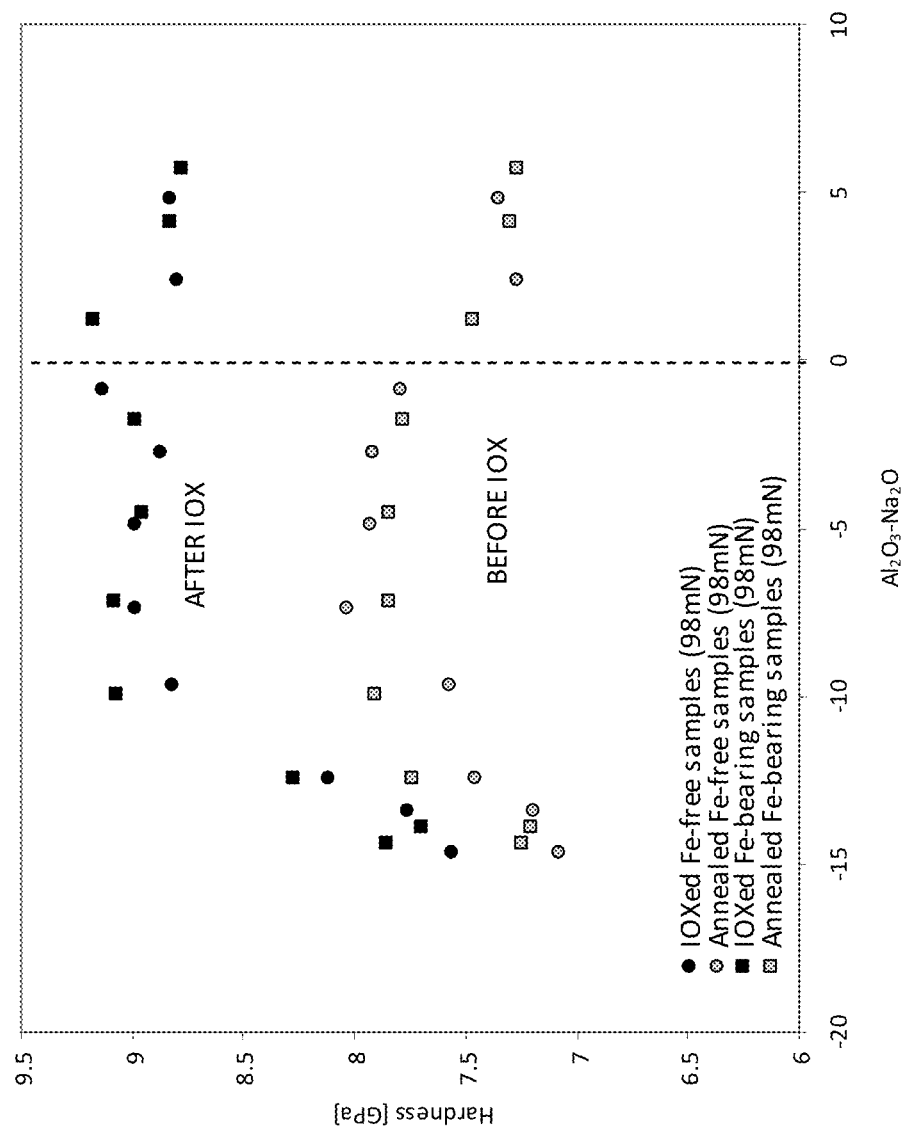
FIG. 8 is a plot of compositional dependence of nanohardness ($H_{nano}$) at 98 mN load force for iron-containing and iron-free boroaluminosilicate glasses.

Additionally, eight hardness measurements using the nano-indentation technique for each composition were also performed on some of the glasses described herein. The hardness values reported in Table 6 were calculated from indentation depths ranging from 598 nm to 998 nm. FIG. 7 is a plot of the loading and penetration depth condition of the experiment performed on sample A117.5, which is listed in Table 6. The compositional dependence of nano-hardness (H$_{nano}$) at 98 mN load force for both iron-containing and iron-free boroaluminosilicate glasses is plotted in FIG. 8. The gray and black solid symbols in FIG. 8 represent glasses before and after ion exchange, respectively, which were ion exchanged at 410° C. for 8 hours in a technical grade KNO$_3$ molten salt bath. The nano-indentation hardness technique does not reveal large differences in hardness for the iron-free and iron-containing glasses, neither before nor after being chemically strengthened in the KNO$_3$ salt bath at 410° C. for 8 hours. In some embodiments, the glasses described herein have a nanohardness of at least about 7 GPa after ion exchanged. Nonetheless, the ion exchanged peraluminous (Al>Na) glass end members exhibit a systematic increase in nano-hardness of about 1.5 GPa compared to glasses without a chemically strengthened surface. The peralkaline (Al<Na) ion exchanged end members also show an increase in nano-hardness when compared with glasses without chemically strengthened surfaces, but the difference is only about 0.5 GPa. This may be due to the lower compressive stresses created in these peralkaline compositions (FIG. 6).

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

TABLE 1

Examples of ion-exchangeable glass compositions containing MgO. The compressive stress (CS) and depth of layer (DOL) were obtained as a result of treatment of annealed samples at 410° C. for 16 hours in technical grade KNO$_3$.

|  | 1 | 2 | 3 | 4 | 5 | 6 | 7 | 8 | 9 | 10 |
|---|---|---|---|---|---|---|---|---|---|---|
| Composition (mol %) | | | | | | | | | | |
| SiO$_2$ | 75.83 | 73.70 | 70.88 | 68.07 | 65.33 | 62.77 | 59.92 | 56.62 | 54.64 | 52.02 |
| Al$_2$O$_3$ | 0.07 | 2.71 | 5.32 | 7.99 | 10.72 | 13.31 | 15.98 | 18.63 | 21.33 | 23.97 |
| Na$_2$O | 15.63 | 15.73 | 15.68 | 15.71 | 15.74 | 15.78 | 15.77 | 15.55 | 15.78 | 15.82 |
| K$_2$O | | | | | | | | | | |
| MgO | 8.11 | 7.62 | 7.88 | 7.98 | 7.95 | 7.90 | 8.08 | 8.94 | 7.99 | 7.93 |
| ZnO | | | | | | | | | | |

TABLE 1-continued

Examples of ion-exchangeable glass compositions containing MgO. The compressive stress (CS) and depth of layer (DOL) were obtained as a result of treatment of annealed samples at 410° C. for 16 hours in technical grade $KNO_3$.

| | 1 | 2 | 3 | 4 | 5 | 6 | 7 | 8 | 9 | 10 |
|---|---|---|---|---|---|---|---|---|---|---|
| CaO | 0.19 | 0.07 | 0.09 | 0.09 | 0.09 | 0.08 | 0.09 | 0.09 | 0.09 | 0.09 |
| SrO | | | | | | | | | | |
| BaO | | | | | | | | | | |
| $SnO_2$ | 0.16 | 0.16 | 0.16 | 0.16 | 0.16 | 0.15 | 0.16 | 0.16 | 0.16 | 0.16 |
| Properties | | | | | | | | | | |
| Anneal Pt (C.): | 507 | 541 | 578 | 617 | 652 | 683 | 698 | 712 | 723 | 732 |
| Strain Pt (C.): | 462 | 495 | 530 | 568 | 601 | 632 | 648 | 662 | 674 | 685 |
| Density (g/cm 3): | 2.415 | 2.424 | 2.437 | 2.448 | 2.461 | 2.47 | 2.49 | 2.501 | 2.513 | 2.527 |
| CTE ($\times 10^{-7}$/C.): | 87.4 | 86.2 | 86.1 | 85.8 | 84.1 | 82.80 | 80.50 | 76.2 | 74.5 | 70.3 |
| Softening Pt (C.): | 708.7 | 748.7 | 791.8 | 836.1 | 875.1 | 909.40 | 924.90 | 936.8 | 939.7 | 938.6 |
| 24-h Liquidus (C.): | 985 | no devit | no devit | no devit | 1180 | >1250 | 1250 | >1385 | >1385 | >1385 |
| Primary Devit Phase: | tridymite | | | | forsterite | forsterite | forsterite | forsterite | unknown | unknown |
| Liquidus Visc (Poise): | 30364 | | | | 21433 | | 11390 | <1517 | <1010 | <813 |
| Poisson's Ratio: | 0.212 | 0.215 | 0.204 | 0.219 | 0.206 | 0.22 | 0.22 | 0.215 | 0.225 | 0.22 |
| Shear Modulus (GPa): | 27.59 | 28.06 | 28.70 | 29.22 | 30.00 | 30.54 | 31.16 | 31.92 | 32.66 | 33.38 |
| Young's Modulus (GPa): | 66.89 | 68.20 | 69.09 | 71.24 | 72.36 | 74.44 | 76.16 | 77.59 | 80.03 | 81.46 |
| Refractive Index: | 1.4971 | 1.4992 | 1.5011 | 1.5034 | 1.5061 | 1.5090 | 1.5123 | 1.5160 | 1.5196 | 1.5234 |
| SOC (nm/cm/MPa): | 28.49 | 28.66 | 28.54 | 28.67 | 28.75 | 28.60 | 28.36 | 27.96 | 27.5 | 27.14 |
| CS (MPa): | 128 | 441 | 663 | 876 | 1062 | 1154 | 1192 | 1166 | 1124 | 1056 |
| DOL (μm): | 44.19 | 48.63 | 47.90 | 46.45 | 46.33 | 43.88 | 39.59 | 32.26 | 24.96 | 19.21 |

TABLE 2

Examples of ion-exchangeable glass compositions containing ZnO. The compressive stress (CS) and depth of layer (DOL) were obtained as a result of treatment of annealed samples at 410° C. for 16 hours in technical grade $KNO_3$.

| | 11 | 12 | 13 | 14 | 15 | 16 | 17 | 18 | 19 | 20 |
|---|---|---|---|---|---|---|---|---|---|---|
| Composition (mol %) | | | | | | | | | | |
| $SiO_2$ | 76.35 | 73.53 | 71.04 | 68.24 | 65.50 | 62.91 | 60.03 | 57.34 | 54.70 | 52.01 |
| $Al_2O_3$ | 0.02 | 2.72 | 5.34 | 8.03 | 10.74 | 13.38 | 16.02 | 18.80 | 21.36 | 24.05 |
| $Na_2O$ | 15.42 | 15.61 | 15.61 | 15.64 | 15.57 | 15.74 | 15.62 | 15.79 | 15.66 | 15.74 |
| $K_2O$ | | | | | | | | | | |
| MgO | | | | | | | | | | |
| ZnO | 8.06 | 7.98 | 7.86 | 7.93 | 8.03 | 7.82 | 8.17 | 7.92 | 8.12 | 8.04 |
| CaO | | | | | | | | | | |
| SrO | | | | | | | | | | |
| BaO | | | | | | | | | | |
| $SnO_2$ | 0.15 | 0.15 | 0.15 | 0.15 | 0.15 | 0.15 | 0.15 | 0.15 | 0.15 | 0.15 |
| Properties | | | | | | | | | | |
| Anneal Pt (C.): | 513 | 544 | 577 | 609 | 639 | 658 | 673 | 684 | 696 | 708 |
| Strain Pt (C.): | 467 | 497 | 528 | 562 | 589 | 609 | 625 | 635 | 647 | 660 |
| Density (g/cm 3): | 2.541 | 2.558 | 2.566 | 2.570 | 2.581 | 2.585 | 2.600 | 2.611 | 2.623 | 2.636 |
| CTE | 86.4 | 85.6 | 85.7 | 84.8 | 83.4 | 81.8 | 78.3 | 75.8 | 71.7 | 68.9 |

TABLE 2-continued

Examples of ion-exchangeable glass compositions containing ZnO. The compressive stress (CS) and depth of layer (DOL) were obtained as a result of treatment of annealed samples at 410° C. for 16 hours in technical grade $KNO_3$.

|  | 11 | 12 | 13 | 14 | 15 | 16 | 17 | 18 | 19 | 20 |
|---|---|---|---|---|---|---|---|---|---|---|
| ($\times 10^{-7}$/C.): Softening Pt (C.): | 706 | 742 | 779 | 819 | 857 | 885 | 902 | 909 | 910 | 915 |
| 24-h Liquidus (C.): | 1040 | no devit | 870 | 935 | no devit | 1070 | 1370 | >1390 | >1390 | >1390 |
| Primary Devit Phase: | Tridymite |  | Albite | Albite |  | Unknown | Spinel | Unknown | Unknown | Unknown |
| Liquidus Visc (Poise): | 8634 |  | 1912534 | 872342 |  | 199960 | 1849 | <1231 | <909 | <10 |
| Poisson's Ratio: | 0.218 | 0.214 | 0.216 | 0.217 | 0.223 | 0.22 | 0.23 | 0.228 | 0.226 | 0.24100 |
| Shear Modulus (GPa): | 27.02 | 27.78 | 28.65 | 29.04 | 29.50 | 30.21 | 30.77 | 31.53 | 32.31 | 32.96 |
| Young's Modulus (GPa): | 65.81 | 67.48 | 69.00 | 70.69 | 72.13 | 73.79 | 75.50 | 77.41 | 79.22 | 81.82 |
| Refractive Index: | 1.5080 | 1.5102 | 1.5123 | 1.5141 | 1.5161 | 1.5345 | 1.5215 | 1.5247 | 1.5286 | 1.5325 |
| SOC (nm/cm/MPa): | 33.08 | 32.94 | 32.99 | 32.74 | 32.22 | 31.65 | 31.01 | 30.36 | 29.67 | 29.10 |
| CS (MPa): |  | 467 | 659 | 872 | 1070 | 1134 | 1186 | 1165 | 1123 | 1023 |
| DOL (μm): |  | 50.01 | 49.50 | 47.01 | 45.57 | 44.24 | 39.31 | 32.32 | 25.63 | 19.65 |

TABLE 3

Examples of ion-exchangeable glass compositions containing CaO. The compressive stress (CS) and depth of layer (DOL) were obtained as a result of treatment of annealed samples at 410° C. for 16 hours in technical grade $KNO_3$.

|  | 21 | 22 | 23 | 24 | 25 | 26 | 27 | 28 | 29 | 30 |
|---|---|---|---|---|---|---|---|---|---|---|
| Composition (mol %) |  |  |  |  |  |  |  |  |  |  |
| $SiO_2$ | 75.88 | 73.19 | 70.73 | 68.08 | 65.20 | 62.58 | 59.83 | 57.18 | 54.26 | 51.82 |
| $Al_2O_3$ | 0.03 | 2.71 | 5.30 | 8.02 | 10.72 | 13.29 | 16.01 | 18.71 | 21.34 | 23.97 |
| $Na_2O$ | 15.72 | 15.76 | 15.78 | 15.72 | 15.77 | 15.80 | 15.79 | 15.68 | 15.70 | 15.81 |
| $K_2O$ |  |  |  |  |  |  |  |  |  |  |
| MgO | 0.10 | 0.10 | 0.11 | 0.09 | 0.12 | 0.12 | 0.13 | 0.13 | 0.13 | 0.13 |
| ZnO |  |  |  |  |  |  |  |  |  |  |
| CaO | 8.11 | 8.10 | 7.91 | 7.92 | 8.03 | 8.05 | 8.08 | 8.15 | 8.40 | 8.11 |
| SrO |  |  |  |  |  |  |  |  |  |  |
| BaO |  |  |  |  |  |  |  |  |  |  |
| $SnO_2$ | 0.16 | 0.16 | 0.16 | 0.16 | 0.16 | 0.16 | 0.16 | 0.15 | 0.16 | 0.16 |
| Properties |  |  |  |  |  |  |  |  |  |  |
| Anneal Pt (C.): | 525 | 548 | 567 | 591 | 619 | 647 | 678 | 710 | 738 | 756 |
| Strain Pt (C.): | 483 | 505 | 524 | 547 | 574 | 601 | 630 | 661 | 690 | 709 |
| Density (g/cm^3): | 2.474 | 2.485 | 2.491 | 2.499 | 2.509 | 2.52 | 2.52 | 2.528 | 2.537 | 2.547 |
| CTE ($\times 10^{-7}$/C.): | 92.5 | 90.9 | 89.4 | 88.2 | 87.7 | 87.00 | 85.40 | 82.8 | 80.2 | 77.3 |
| Softening Pt (C.): | 700.2 | 725.1 | 749.9 | 779.5 | 811 | 845.00 | 882.10 | 921.5 |  |  |
| 24-h Liquidus (C.): | 990 | 900 | 990 | 1070 | 1250 | 1250 | 1155 | 1245 | 1300 | 1295 |
| Primary Devit Phase: | tridymite | devitrite | devitrite | devitrite | anorthite | anorthite | nepheline | nepheline | unknown | unknown |
| Liquidus Visc (Poise): | 10657 |  |  |  | 2165 | 3704 | 29476 | 10457 | 4955 | 4573 |
| Poisson's Ratio: | 0.212 | 0.212 | 0.223 | 0.221 | 0.223 | 0.23 | 0.22 | 0.237 | 0.238 | 0.221 |
| Shear Modulus | 28.78 | 29.28 | 29.70 | 30.10 | 30.53 | 30.91 | 31.25 | 31.62 | 32.16 | 32.82 |

TABLE 3-continued

Examples of ion-exchangeable glass compositions containing CaO. The compressive stress (CS) and depth of layer (DOL) were obtained as a result of treatment of annealed samples at 410° C. for 16 hours in technical grade KNO₃.

| | 21 | 22 | 23 | 24 | 25 | 26 | 27 | 28 | 29 | 30 |
|---|---|---|---|---|---|---|---|---|---|---|
| Young's Modulus (GPa): | 69.75 | 71.00 | 72.62 | 73.48 | 74.66 | 75.70 | 76.47 | 78.24 | 79.64 | 80.17 |
| Refractive Index: | 1.5119 | 1.5138 | 1.5150 | 1.5166 | 1.5183 | 1.5198 | 1.5218 | 1.5235 | 1.5259 | 1.5292 |
| SOC (nm/cm/MPa): | 27.33 | 27.41 | 27.5 | 27.49 | 27.36 | 27.39 | 27.45 | 27.35 | 27.11 | 26.71 |
| CS (MPa): | | 381 | 601 | 738 | 911 | 1037 | 1123 | 1152 | 1139 | 1068 |
| DOL (μm): | | 25.18 | 24.85 | 25.90 | 26.98 | 28.10 | 27.81 | 25.83 | 22.11 | 18.07 |

TABLE 4

Examples of ion-exchangeable glass compositions containing a mixture of MgO and CaO. The compressive stress (CS) and depth of layer (DOL) were obtained as a result of treatment of annealed samples at 410° C. for 16 hours in technical grade KNO₃.

| | 31 | 32 | 33 | 34 | 35 |
|---|---|---|---|---|---|
| Composition (mol %) | | | | | |
| $SiO_2$ | 59.85 | 59.81 | 59.73 | 59.91 | 60.11 |
| $Al_2O_3$ | 15.97 | 16.02 | 16.00 | 15.99 | 15.96 |
| $Na_2O$ | 15.85 | 15.70 | 15.75 | 15.79 | 15.82 |
| $K_2O$ | | | | | |
| MgO | 1.65 | 3.41 | 5.14 | 5.76 | 6.39 |
| ZnO | | | | | |
| CaO | 6.52 | 4.90 | 3.23 | 2.40 | 1.57 |
| SrO | | | | | |
| BaO | 0.16 | 0.16 | 0.15 | 0.16 | 0.16 |
| Properties | | | | | |
| Anneal Pt (C.): | 677 | 681 | 683 | 686 | 692 |
| Strain Pt (C.): | 629 | 632 | 633 | 637 | 642 |
| Density (g/cm^3): | 2.516 | 2.507 | 2.5 | 2.496 | 2.492 |
| CTE (×10^−7/C.): | 84.5 | 82.9 | 82.4 | 81.8 | 81.7 |
| Softening Pt (C.): | 889 | 901 | 910 | 914 | 919 |
| 24-h Liquidus (C.): | 1150 | 1160 | 1150 | 1160 | 1190 |
| Primary Devit Phase: | nepheline | nepheline | nepheline | forsterite | forsterite |
| Liquidus Visc (Poise): | 37523 | 49496 | 58629 | 53212 | |
| Poisson's Ratio: | 0.229 | 0.225 | 0.222 | 0.229 | 0.226 |
| Shear Modulus (GPa): | 31.2 | 31.3 | 31.4 | 31.3 | 31.3 |
| Young's Modulus (GPa): | 76.8 | 76.6 | 76.6 | 77.0 | 76.7 |
| Refractive Index: | 1.5198 | 1.5177 | 1.5159 | 1.5151 | 1.5138 |
| SOC (nm/cm/MPa): | 27.61 | 27.79 | 27.94 | 28.04 | 28.14 |
| CS (MPa): | 1168 | 1196 | 1210 | 1212 | 1202 |
| DOL (μm): | 29.31 | 31.62 | 33.19 | 34.60 | 37.27 |

| | 36 | 37 | 38 | 39 | 40 |
|---|---|---|---|---|---|
| Composition (mol %) | | | | | |
| $SiO_2$ | 59.93 | 60.08 | 60.00 | 61.92 | 63.96 |
| $Al_2O_3$ | 15.98 | 15.99 | 15.99 | 15.18 | 14.39 |
| $Na_2O$ | 15.83 | 14.67 | 13.86 | 15.00 | 14.21 |

TABLE 4-continued

Examples of ion-exchangeable glass compositions containing a mixture of MgO and CaO. The compressive stress (CS) and depth of layer (DOL) were obtained as a result of treatment of annealed samples at 410° C. for 16 hours in technical grade $KNO_3$.

| | | | | | |
|---|---|---|---|---|---|
| $K_2O$ | | 1.07 | | | 1.87 |
| MgO | 7.33 | 5.65 | 5.74 | 5.46 | 5.14 |
| ZnO | | | | | |
| CaO | 0.78 | 2.38 | 2.39 | 2.28 | 2.14 |
| SrO | | | | | |
| BaO | 0.16 | 0.16 | 0.16 | 0.16 | 0.15 |
| Properties | | | | | |
| Anneal Pt (C.): | 695 | 684 | 685 | 689 | 693 |
| Strain Pt (C.): | 645 | 635 | 635 | 639 | 641 |
| Density ($g/cm^3$): | 2.49 | 2.50 | 2.495 | 2.485 | 2.472 |
| CTE ($\times 10^{-7}/C.$): | 81.60 | 84.10 | 85.2 | 78.9 | 76.5 |
| Softening Pt (C.): | 922 | 917 | 920 | 923 | 934 |
| 24-h Liquidus (C.): | 1240 | 1160 | 1185 | 1165 | 1160 |
| Primary Devit Phase: | forsterite | forsterite | forsterite | forsterite | forsterite |
| Liquidus Visc (Poise): | 13399 | 58464 | 38735 | 63867 | 98439 |
| Poisson's Ratio: | 0.225 | 0.227 | 0.227 | 0.22 | 0.216 |
| Shear Modulus (GPa): | 31.3 | 31.5 | 31.5 | 31.1 | 31.0 |
| Young's Modulus (GPa): | 76.7 | 77.2 | 77.3 | 76.0 | 75.3 |
| Refractive Index: | 1.5132 | 1.5149 | 1.5149 | 1.5128 | 1.5102 |
| SOC (nm/cm/MPa): | 28.16 | 27.93 | 27.94 | 28.38 | 28.68 |
| CS (MPa): | 1197 | 1140 | 1088 | 1172 | 1136 |
| DOL (μm): | 38.52 | 41.24 | 45.69 | 36.11 | 38.15 |

TABLE 5

Examples of ion-exchangeable glass compositions containing SrO or BaO. The compressive stress (CS) and depth of layer (DOL) were obtained as a result of treatment of annealed samples at 410° C. for 16 hours in technical grade $KNO_3$.

| | 41 | 42 | 43 | 44 | 45 | 46 | 47 | 48 |
|---|---|---|---|---|---|---|---|---|
| Composition (mol %) | | | | | | | | |
| $SiO_2$ | 76.26 | 67.91 | 60.22 | 52.01 | 75.99 | 67.70 | 60.27 | 51.86 |
| $Al_2O_3$ | 0.03 | 7.96 | 15.94 | 23.96 | 0.03 | 8.07 | 15.98 | 24.05 |
| $Na_2O$ | 15.58 | 15.90 | 15.72 | 15.87 | 15.62 | 15.89 | 15.60 | 15.88 |
| $K_2O$ | | | | | | | | |
| MgO | | | | | | | | |
| ZnO | | | | | | | | |
| CaO | | | | | | | | |
| SrO | 7.99 | 8.09 | 7.98 | 8.02 | | | | |
| BaO | | | | | 8.21 | 8.17 | 7.99 | 8.05 |
| $SnO_2$ | 0.14 | 0.14 | 0.14 | 0.15 | 0.16 | 0.17 | 0.16 | 0.16 |
| Properties | | | | | | | | |
| Anneal Pt (C.): | 501 | 565 | 659 | 773 | 470 | 539 | 633 | 774 |
| Strain Pt (C.): | 460 | 520 | 610 | 721 | 431 | 496 | 585 | 725 |
| Density ($g/cm^3$): | 2.605 | 2.635 | 2.646 | 2.66 | 2.732 | 2.75 | 2.75 | 2.764 |
| CTE ($\times 10^{-7}/C.$): | 96.8 | 91.2 | 90 | 81 | 100.7 | 93.90 | 87.60 | 86.3 |
| Softening Pt (C.): | 676 | 751 | 867 | | 648 | 722 | 849 | |
| 24-h Liquidus (C.): | 990 | 1000 | 1165 | >1390 | 980 | 860 | 1240 | 1360 |
| Primary Devit Phase: | Tridymite | Unknown | Unknown | Unknown | Tridymite | Albite | Unknown | Unknown |
| Liquidus Visc (Poise): | 7898 | 33812 | 19965 | <1645 | 5587 | 517914 | 10 | 3545 |
| Poisson's Ratio: | 0.225 | 0.23 | 0.229 | 0.232 | 0.228 | 0.23 | | 0.23 |

TABLE 5-continued

Examples of ion-exchangeable glass compositions containing SrO or BaO.
The compressive stress (CS) and depth of layer (DOL) were obtained as a result of
treatment of annealed samples at 410° C. for 16 hours in technical grade $KNO_3$.

|  | 41 | 42 | 43 | 44 | 45 | 46 | 47 | 48 |
|---|---|---|---|---|---|---|---|---|
| Shear Modulus (GPa): | 27.65 | 29.59 | 31.10 | 32.28 | 26.53 | 28.66 |  | 31.67 |
| Young's Modulus (GPa): | 67.77 | 72.77 | 76.46 | 79.57 | 65.16 | 70.66 |  | 77.92 |
| Refractive Index: | 1.5150 | 1.5212 | 1.5251 | 1.5310 | 1.5242 | 1.5296 | 1.5326 | 1.5370 |
| SOC (nm/cm/MPa): | 26.82 | 26.62 | 26.73 | 25.92 | 25.43 | 25.44 | 25.74 | 26.35 |
| CS (MPa): |  | 695 | 1137 | 1093 |  | 571 | 1053 | 1040 |
| DOL (μm): |  | 21.46 | 20.43 | 18.41 |  | 17.40 | 15.71 | 18.18 |

TABLE 6

Analyzed compositions and selected properties of boroaluminosilicate
glasses in which the ratio $[SiO_2]/[Al2O_3]$ was modified. The iron redox ratio was
determined by $^{57}$Fe Mössbauer spectroscopy on iron-containing glasses.

| Glass ID | Chemical composition (mol %) | | | | | | CS (MPa) | N4 (at %) | log Diffusivity ($cm^2$/s) | $[Fe^{3+}]/[Fe]_{tot}$ (at %) | Hardness $H_{nano}$ (Gpa) |
|---|---|---|---|---|---|---|---|---|---|---|---|
|  | $SiO_2$ | $Al_2O_3$ | $Na_2O$ | $B_2O_3$ | $Fe_2O_3$ | $As_2O_3$ |  |  |  |  |  |
| Al0* | 79.4 | 0.3 | 14.6 | 4.9 | 0.9 | 0 | 390 | n/a | −10.63 | n/a | 7.25 |
| Al1* | 78.9 | 0.7 | 14.5 | 4.9 | 0.9 | 0 | 421.7 | n/a | −10.67 | n/a | 7.21 |
| Al2.5* | 77.4 | 2.2 | 14.6 | 4.9 | 0.9 | 0 | 451 | n/a | −10.74 | 94 | 7.74 |
| Al5* | 74.7 | 4.7 | 14.6 | 5 | 1 | 0 | 558.6 | n/a | −10.72 | 92 | 7.91 |
| Al7.5* | 71.8 | 7.6 | 14.7 | 4.9 | 1 | 0 | 688.3 | n/a | −10.59 | 90 | 7.85 |
| Al10* | 68.9 | 10.3 | 14.8 | 5 | 1 | 0 | 789 | n/a | −10.46 | 81 | 7.85 |
| Al12.5* | 67.1 | 12.6 | 14.3 | 5 | 1 | 0 | 906.8 | n/a | −10.26 | 78 | 7.78 |
| Al15* | 64.1 | 15.6 | 14.3 | 5 | 1 | 0 | 995 | n/a | −10.16 | 76 | 7.46 |
| Al17.5* | 62.3 | 17.9 | 13.7 | 5.1 | 0.9 | 0 | 1073.3 | n/a | −10.35 | n/a | 7.30 |
| Al20* | 61.1 | 19.4 | 13.6 | 5 | 0.9 | 0 | 1041.4 | n/a | −10.54 | n/a | 7.27 |
| Al0 | 80.1 | 0.2 | 14.8 | 4.8 | 0 | 0.2 | 364.8 | 95 | −10.46 | n/a | 7.08 |
| Al1 | 79.4 | 1.2 | 14.5 | 4.9 | 0 | 0.1 | 400.4 | 92 | −10.55 | n/a | 7.19 |
| Al2.5 | 78.8 | 2 | 14.4 | 4.7 | 0 | 0.1 | 370.6 | 90 | −10.57 | n/a | 7.45 |
| Al5 | 78.1 | 4 | 13.6 | 4.2 | 0 | 0.1 | 445.8 | 87 | −10.65 | n/a | 7.57 |
| Al7.5 | 76.9 | 5.7 | 13 | 4.3 | 0 | 0.1 | 557 | 77 | −10.64 | n/a | 8.03 |
| Al10 | 75.9 | 7.5 | 12.3 | 4.3 | 0 | 0.1 | 602.1 | 68 | −10.52 | n/a | 7.92 |
| Al12.5 | 72 | 10.4 | 13.1 | 4.4 | 0 | 0.1 | 760.5 | 39 | −10.31 | n/a | 7.92 |
| Al15 | 69.2 | 12.7 | 13.5 | 4.6 | 0 | 0.1 | 869 | 17 | −10.12 | n/a | 7.79 |
| Al17.5 | 63 | 17.2 | 14.7 | 5 | 0 | 0.1 | 1058.9 | 0 | −10.17 | n/a | 7.27 |
| Al20 | 60.5 | 19.6 | 14.7 | 5 | 0 | 0.1 | 1018 | 0 | −10.42 | n/a | 7.35 |

The invention claimed is:

1. An alkali aluminosilicate glass, the alkali aluminosilicate glass having a liquidus viscosity in a range from at least 20 kiloPoise to 64 kiloPoise and comprising at least 59 mol % to about 76 mol % $SiO_2$; from 16 mol % to about 20 mol % $Al_2O_3$, 0 mol % $B_2O_3$, from 0 mol % to about 20 mol % $Li_2O$; from 12.3 mol % to about 20 mol % $Na_2O$; from 0 mol % to about 8 mol % $K_2O$; from 0 mol % to about 10 mol % MgO; and from 0 mol % to about 10 mol % ZnO, wherein $Al_2O_3$ (mol %)−$Na_2O$ (mol %)≥−4 mol %, wherein $Al_2O_3$ is present in a tetrahedral configuration, and wherein the alkali aluminosilicate glass, when ion exchanged, has a compressive layer extending from a surface of the alkali aluminosilicate glass into the alkali aluminosilicate glass to a depth of layer, wherein the compressive layer is under a compressive stress of at least 1.1 GPa.

2. The alkali aluminosilicate glass of claim 1, wherein 12.3 mol %≤$Li_2O+Na_2O+K_2O$≤20 mol %.

3. The alkali aluminosilicate glass of claim 1, wherein the alkali aluminosilicate glass comprises at least one of MgO, CaO, SrO, BaO, and ZnO.

4. The alkali aluminosilicate glass of claim 1, wherein the alkali aluminosilicate glass is free of divalent metal oxides.

5. The alkali aluminosilicate glass of claim 1, wherein the alkali aluminosilicate glass is ion exchanged and has a compressive layer extending from a surface of the alkali aluminosilicate glass into the alkali aluminosilicate glass to a depth of layer.

6. The alkali aluminosilicate glass of claim 5, wherein the compressive layer is under a compressive stress of at least 1.1 GPa.

7. The alkali aluminosilicate glass of claim 5, wherein the alkali aluminosilicate glass has a nanohardness of at least 7 GPa.

8. The alkali aluminosilicate glass of claim 1, further comprising at least one fining agent.

9. The alkali aluminosilicate glass of claim 8, wherein the fining agent comprises at least one of $SnO_2$, $As_2O_3$, and $Sb_2O_3$.

10. The alkali aluminosilicate glass of claim 1, wherein the alkali aluminosilicate glass is free of divalent metal oxides other than MgO and ZnO.

11. An alkali aluminosilicate glass, the alkali aluminosilicate glass being free of $TiO_2$ and comprising at least 59 mol % to about 76 mol % $SiO_2$; from 16 mol % to about 20 mol % $Al_2O_3$; 0 mol % $B_2O_3$; from 0 mol % to about 20 mol % $Li_2O$; from 12.3 mol % to about 20 mol % $Na_2O$; from 0 mol % to about 8 mol % $K_2O$; from 0 mol % to about 10 mol % MgO; and from 0 mol % to about 10 mol % ZnO, wherein $Al_2O_3$ (mol %)–$Na_2O$ (mol %)≥−4 mol %, wherein the alkali aluminosilicate glass has a liquidus viscosity in a range from at least 20 kiloPoise to 64 kiloPoise, and wherein the alkali aluminosilicate glass is ion exchanged and has a compressive layer extending from a surface of the alkali aluminosilicate glass into the alkali aluminosilicate glass to a depth of layer, the compressive layer being under a compressive stress of at least 1.1 GPa.

12. The alkali aluminosilicate glass of claim 11, wherein 12.3 mol %≤$Li_2O$+$Na_2O$+$K_2O$≤20 mol %.

13. The alkali aluminosilicate glass of claim 11, wherein the alkali aluminosilicate glass comprises at least one of MgO, CaO, SrO, BaO, and ZnO.

14. The alkali aluminosilicate glass of claim 11, wherein the alkali aluminosilicate glass is free of divalent metal oxides.

15. The alkali aluminosilicate glass of claim 11, wherein the alkali aluminosilicate glass is free of divalent metal oxides other than MgO and ZnO.

* * * * *